JOHN GERARD MAC ARTHUR
INVENTOR.

BY John L Jackson

ATTORNEY 3,206,653

ONE RELAY FLIP-FLOP

John Gerard MacArthur, Canoga Park, Calif., assignor, by mesne assignments, to The Bunker-Ramo Corporation, Stamford, Conn., a corporation of Delaware Filed Oct. 2, 1961, Ser. No. 142,112
4 Claims. (Cl. 317—155.5)

This invention relates to digital computers in general and more particularly to a one relay flip-flop for use therein.

One of the most widely used building blocks in use in digital computers at the present time is the flip-flop. Not only is there a wide use of flip-flops in the basic computer itself but there is also a wide use of flip-flops in the peripheral equipment such as input-output equipment, counters, control devices and binary-to-decimal and decimal-to-analog converters. In a great majority of these applications, especially those that deal with output devices, the current requirement is many times in the range of one to five amps.

Of the several types of flip-flops currently in use at the present time, electronic flip-flops utilizing vacuum tubes or transistors are the most widely used. The electronic flip-flop does, however, possess certain undesirable characteristics. For instance, normally the current delivering capability of electronic flip-flops is relatively low. Special high-current capability flip-flops can, however, be designed, but the special design results in a flip-flop which is quite expensive and has a large number of components. As is well known, the reliability of a flip-flop decreases with an increase in components and, additionally, an increase in components results in added fabrication costs and field servicing.

Numerous attempts have been made to develop a high-current capability flip-flop utilizing a bi-stable latching relay to achieve flip-flop characteristics. These bi-stable magnetic latching relays, while being capable of high-current capabilities, do not possess all of the characteristics of an R-S flip-flop since their output signals cannot be gated to their own input terminals. Thus, since in most applications this is a basic requirement, they have proved to be quite unsatisfactory.

It is, therefore, an object of the present invention to provide a novel one relay flip-flop capable of having its output signals applied thereto as input signals by providing storage of input signals and changing to an opposite state after a selected period.

Another object of the present invention is to provide a one relay flip-flop having high current delivering capabilities.

Another object of the present invention is to provide a flip-flop of high reliability.

Another object of the present invention is to provide a flip-flop with a minimum number of components which is relatively inexpensive to manufacture and which requires relatively little field servicing.

Other and further objects and advantages of the present invention will become apparent to one skilled in the art from a consideration of the following detailed description when read in light of the accompanying drawings, in which.

Figure 1:
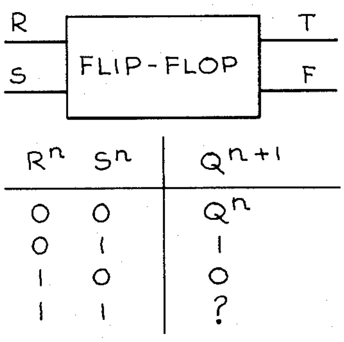
FIG. 1 is a block representation of an R-S flip-flop along with a truth table representative of the inputs to the flip-flop and the associated outputs.

Refer first to FIG. 1 wherein is shown a block schematic of a conventional R-S flip-flop. An input on the S line, the set line, sets the flip-flop to a "one" state, with line T being true or high, while an input to the R line resets the flip-flop, putting the output T in the "zero" or low state and the output F in the true or high state.

The logical characteristics of an R-S flip-flop are shown by the truth table of FIG. 1. Considering the truth table of FIG. 1, on the left are the possible states of the R-S lines at time $n$. On the right at time $n+1$ are the states $Q^n$ resulting from the various input combinations. Thus it is seen that when both inputs are "0," the state at $n+1$ is the same as the previous state, i.e., $Q^n+1=Q^n$. Also, when both inputs are true, the action of the flip-flop is indeterminate.

Figure 2:
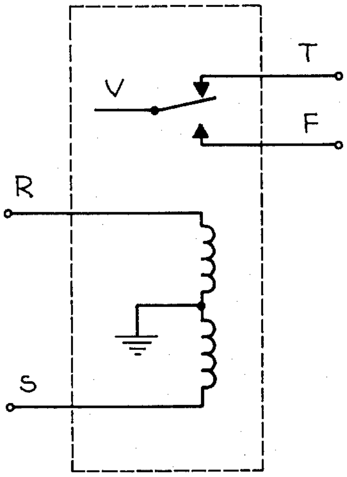
FIG. 2 is a conventional bi-stable magnetic latching relay flip-flop currently in use at the present time.

Refer next to FIG. 2 wherein is shown a flip-flop utilizing a bi-stable magnetic latching relay. In this flip-flop, assuming that the logical levels of the associated computer or equipment in which the flip-flop is utilized, are ground and a positive voltage, the positive voltage will be applied along a line V which, if the flip-flop is in the state as shown in FIG. 2, will result in a positive voltage appearing on the true line and a zero voltage appearing on the false line. As is obvious from a consideration of the device of FIG. 2, it can be seen that it is impossible to gate the output signals of the flip-flop to its own input terminals as input signals because of the absence of an arrangement for delaying the input signals.

Figure 3:
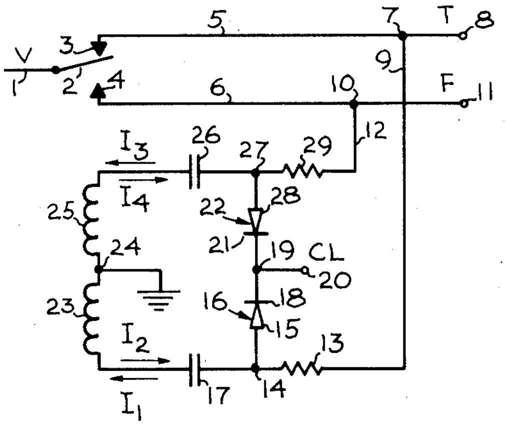
FIG. 3 is a schematic of one embodiment of the novel one relay flip-flop of the present invention operating in a counter arrangement in accordance with the principles of this invention.

Refer next to FIG. 3 wherein is shown a schematic of the hereindescribed novel one relay flip-flop operating in a novel counter arrangement. A voltage V corresponding to one of the logical levels of the computer utilizing the one relay flip-flop is continuously applied to line 1. In one arrangement in accordance with this invention, the logical levels will be considered to be positive for true and ground for false. The positive voltage V which is applied along line 1 is alternately directed through means of armature 2 to contacts 3 and 4 which in turn are connected to lines 5 and 6 respectively. Line 5 in turn is connected to junction 7 which branches to the true output pickoff 8 and line 9. Line 6 in turn is connected to junction 10 which branches to the false pickoff 11 and line 12. Line 9 is connected through a switch 32 to a resistor 13 to junction 14 which is connected both to anode 15 of diode 16 and one side of capacitor 17. To the cathode 18 of diode 16 is connected junction 19 which is connected to the clock terminal 20 and the cathode 21 of diode 22. The other side of capacitor 17 is connected to one side of relay winding 23 with the other side of relay winding 23 being connected to junction 24 which is grounded. Junction 24 is also connected to one side of relay winding 25, the other side of which is connected to one side of capacitor 26. The other side of capacitor 26 is connected to junction 27 which is connected to both the anode 28 of diode 22 and one side of resistor 29. The other side of resistor 29 is connected through a switch 34 to line 12. The switches 32 and 34 are provided to more clearly explain the operation of the relay flip-flop in accordance with this invention as an R-S flip-flop having two informational input terminals and two output terminals. The switch 32 has a movable arm that contacts a terminal 36 connected to the line 9 and the switch 34 has a movable arm that contacts a terminal 38 connected to the line 12, when the circuit of FIG. 3 is operating as a counter. When the movable arms of the flip-flops 32 and 34 are moved to contact respective logical input terminals 40 and 42, the circuit of FIG. 3 operates as an R-S flip-flop with the terminals 8 and 11 providing the output terminals to which are applied signals of opposite logical levels.

While in the following description the one relay flip-flop will be decsribed and, as shown, is suited for use with logical levels of positive for true and ground for false, it will become clear that with minor modifications the one relay flip-flop can be made to function with different logical levels of, for instance, ground for false and a minus voltage for true.

Figure 4:
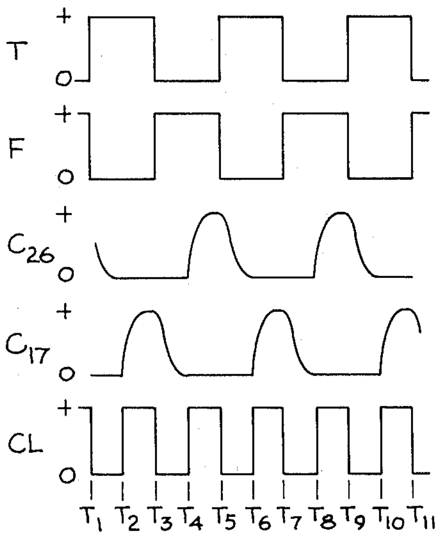
FIG. 4 shows wave forms illustrative of the operation of the one relay flip-flop of FIG. 3.

The circuit of FIG. 3 will be first explained operating as a counter with the switches 32 and 34 in the positions shown. The postive voltage V representing the true logical level of the computer or associated device is applied along line 1 and responsive to current through windings 23 and 25 is alternately switched through means of armature 2 and contacts 3 and 4 to lines 5 and 6. The voltages present on lines 5 and 6 are taken for outputs from terminals 8 and 11. Assume that the flip-flop has just switched to the true state, as shown in FIG. 3, and assume further that the capacitors 26 and 17 are discharged. The wave forms representing these conditions are shown at $T_1$ in FIG. 4. The clock which is applied at terminal 20 prevents capacitor 17 from charging up. However, when the clock which holds junction 19 to zero or ground is removed, current flows along line 9, through resistor 13, effectively through capacitor 17, and through winding 23 to ground. The current $I_1$ is in a direction such that the relay is not operated. Thus from times $T_2$ through $T_3$, the capacitor 17 is charged positively. When the clock pulse is again applied at time $T_3$ to clock terminal 20, diode 16 is forward biased and capacitor 17 discharges through diode 16, junction 19 and the clock terminal to ground. At this time the current $I_2$ is in a direction such that winding 23 is energized and armature 2 switches to contact 4.

Thus no voltage is on the true output terminal 8 whereas a positive voltage is on the false output terminal 11. Capacitor 26 is, however, prevented from charging until time $T_4$ when the clock pulse rises to its maximum positive potential at which time current $I_3$ flows through resistor 29, effectively through capacitor 26 and through winding 25 to ground. The current $I_3$ at this time is in a direction such that the winding 25 is not energized. Capacitor 26 is thus charged. When the clock pulse falls to ground or zero at time $T_5$, capacitor 25 begins to discharge through diode 22 and the clock terminal 20 to ground. Current $I_4$ at this time is in a direction such that winding 25 is energized and the armature 22 switches to contact 3.

When the movable arms of the switches 32 and 34 are moved from the positions shown to contact the respective input terminals 40 and 42, the circuit of FIG. 3 operates as a flip-flop having two informational input terminals 40 and 42, two output terminals 8 and 11, and the clock input terminal 20. The operation is similar to that discussed above except logical informational input signals similar to the T and F waveforms of FIG. 4 and of selected sequences of polarity relations are applied to the respective terminals 40 and 42 at a first clock time such as $T_1$. The information may be temporarily stored at the time $T_2$ in one of the capacitors 17 or 26 and the flip-flop may trigger at time $T_3$ to the stored condition as determined by the informational input signals. It is to be noted that if the logical input information is of the same binary state as the existing binary state of the armature 2, the operation of charging of the capacitors 17 or 26 and of currents $I_2$ or $I_4$ passing through the respective windings 23 or 25 is similar to that discusseed above except the existing state or position of the armature 2 is not changed. Thus, either binary state or armature position may be stored in the flip-flop in accordance with this invention by either changing a previously stored state as defined by the position of the armature 2 or by maintaining the existing position of the armature 2. The flip-flop is of the R-S type because two "0" input signals do not change the existing binary state, input signals of opposite states change the binary state of the flip-flop one time period later and two binary "1" input signals change the flip-flop to an indeterminate state.

Thus it can be seen that the output signals of the one relay flip-flop of the present invention can be gated to its own input since the relay is caused to change from one state to the other, not by the initial current surge obtained from the source V, but is caused to change one time period later, which may be equal to the width of the clock pulse, through utilization of temporary storage means, capacitors 26 and 17. Thus the major shortcoming of prior art type flip-flops, which is that the output cannot be gated to their inputs due to the delay inherent between the time of energization of a winding and the actual operation of the armature, has been overcome and a relay capable of having its output gated to its own input has thus been provided.

In the abovedescribed manner I have provided a novel one relay flip-flop which is capable of high current delivering capabilities and which employs a minimum number of components which results in a less expensive flip-flop in comparison with existing flip-flops of the high-current type. Additionally, I have provided a flip-flop which, due to the minimum number of components employed, results in a flip-flop of extremely high reliability and a flip-flop which is readily fabricated and maintained in the field.

While there has been described what is at present considered to be a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What I claim is:

1. A flip-flop circuit comprising: a magnetic latching relay having first and second windings and a two-positioned armature settable into electrical contact with first and second contacts, an output terminal electrically connected to said first contact, an output terminal electrically connected to said second contact, a source electrically connected to said armature, one side of a first resistor electrically connected to said first contact the other side of which is electrically connected to a junction between one side of a first capacitor and anode of a first diode, the cathode of said diode being electrically connected to a clock terminal, the other side of said first capacitor being connected to one side of said second winding, the other side of said second winding being connected to ground, said second contact being electrically connected to one side of a second resistor, the other side of said second resistor being connected to the junction between one side of a second capacitor and anode of a second diode, the cathode of said second diode being electrically connected to said clocking terminal, the other side of said second capacitor being electrically connected to one side of said first winding, and the other side of said first winding being electrically connected to ground.

2. In combination with first and second output terminals and a source of potential, circuit means for alternately connecting said source of potential directly to said first and second output terminals in response to a signal applied to a control terminal, said circuit means comprising:

a magnetic latching relay including an armature connected to said source of potential and first and second windings respectively energizable to move said armature into contact with said first and second output terminals;

each of said first and second windings having first and second terminals;

means connecting said first winding terminals to a source of reference potential;

first and second capacitors;

means connecting said first capacitor between said first winding second terminal and said first output terminal;

means connecting said second capacitor between said second winding second terminal and said second output terminal;

first and second diodes;

means connecting said first diode between said control terminal and said first output terminal; and means connecting said second diode between said control terminal and said second output terminal.

3. In combination with first and second output terminals and a source of potential, circuit means for alternately connecting said source of potential directly to said first and second output terminals in response to a signal applied to a control terminal, said circuit means comprising:

a magnetic latching relay including an armature connected to said source of potential and first and second windings respectively energizable to move said armature into contact with said first and second output terminals;

each of said first and second windings having first and second terminals;

means connecting said first winding terminals to a source of reference potential;

first and second capacitors;

first and second resistors;

means connecting said first resistor and said first capacitor in series between said first winding second terminal and said first output terminal;

means connecting said second resistor and said second capacitor in series between said second winding second terminal and said second output terminal;

first and second diodes;

means connecting said first diode between said control terminal and the junction defined between said first resistor and said first capacitor; and means connecting said second diode between said control terminal and the junction defined between said second resistor and said second capacitor.

4. The combination of claim 3 including means for selectively applying said signal to said control terminals for forward biasing said diodes.

References Cited by the Examiner

UNITED STATES PATENTS

| | | | |
|---|---|---|---|
| 2,476,963 | 7/49 | Dunn | 317—151 X |
| 2,635,197 | 4/53 | Routledge et al. | 317—151 X |
| 2,914,710 | 11/59 | Bell | 317—140 |

SAMUEL BERNSTEIN, *Primary Examiner.*